United States Patent
Bayersdorfer

(10) Patent No.: US 7,441,913 B2
(45) Date of Patent: *Oct. 28, 2008

(54) LIGHTING SYSTEM FOR DISPLAYS IN VEHICLES

(75) Inventor: Bernhard Bayersdorfer, Baierbach (DE)

(73) Assignee: Lisa Dräxlmaier GmbH, Vilsbiburg (DE)

(*) Notice: Subject to any disclaimer, the term of this patent is extended or adjusted under 35 U.S.C. 154(b) by 9 days.

This patent is subject to a terminal disclaimer.

(21) Appl. No.: 11/066,183

(22) Filed: Feb. 25, 2005

(65) Prior Publication Data

US 2005/0195614 A1 Sep. 8, 2005

Related U.S. Application Data

(63) Continuation-in-part of application No. 10/742,840, filed on Dec. 23, 2003.

(30) Foreign Application Priority Data

Dec. 23, 2002 (DE) ............................. 10 260 831
Feb. 25, 2004 (DE) ........................ 10 2004 009 208

(51) Int. Cl.
*G01D 11/28* (2006.01)

(52) U.S. Cl. ................... 362/29; 362/28; 362/30; 362/23; 362/489; 362/488; 362/800; 362/236; 362/240

(58) Field of Classification Search ................ 362/489, 362/491, 235, 311, 23, 27–30, 545, 542, 362/544; 40/542, 544; 200/310–312, 314, 200/317
See application file for complete search history.

(56) References Cited

U.S. PATENT DOCUMENTS

| | | | |
|---|---|---|---|
| 3,262,224 A * | 7/1966 | Hardesty | 40/546 |
| 4,012,632 A * | 3/1977 | Stone | 362/23 |
| 4,768,300 A * | 9/1988 | Rutili | 40/546 |
| 5,003,433 A | 3/1991 | Fournier | |
| 5,249,104 A * | 9/1993 | Mizobe | 362/605 |
| 5,537,300 A * | 7/1996 | Kraines et al. | 362/86 |
| 5,555,161 A | 9/1996 | Roe et al. | |
| 5,572,817 A | 11/1996 | Chien | |
| 5,747,756 A | 5/1998 | Boedecker | |
| 5,839,810 A | 11/1998 | Hersel et al. | |
| 6,217,183 B1 | 4/2001 | Shipman | |
| 6,357,904 B1 | 1/2002 | Kawashima | |
| 6,404,463 B1 | 3/2002 | Knoll et al. | |
| 6,409,355 B1 * | 6/2002 | Simon et al. | 362/23 |

(Continued)

FOREIGN PATENT DOCUMENTS

| | | |
|---|---|---|
| DE | 8 816 551.5 U1 | 12/1989 |
| DE | 195 29 207 A1 | 2/1997 |
| DE | 196 54 418 A1 | 6/1998 |
| DE | 197 02 957 A1 | 8/1998 |

(Continued)

*Primary Examiner*—Alan Cariaso
*Assistant Examiner*—Robert May
(74) *Attorney, Agent, or Firm*—Sughrue Mion, PLLC

(57) ABSTRACT

A lighting system (10) for displays, in particular in motor vehicles, comprises: a support (12), at least one first lighting means (14) for punctiform illumination, which is disposed on the support (12), a second lighting means (16) for punctiform illumination, which is disposed on the support (12), and a transparent cover (18), which is arranged at a distance from the support (12) on the side of the support with the first and second lighting means (14, 16), and which has at least one symbol (20) to be illuminated from behind by the first and second lighting means (14).

18 Claims, 2 Drawing Sheets

U.S. PATENT DOCUMENTS

| | | |
|---|---|---|
| 6,417,779 B1 | 7/2002 | Noll et al. |
| 6,467,924 B2 | 10/2002 | Shipman |
| 6,595,656 B2 * | 7/2003 | Yoda .......................... 362/187 |
| 6,652,128 B2 | 11/2003 | Misaras |
| 6,871,978 B2 | 3/2005 | Chan et al. |
| 2001/0004317 A1 | 6/2001 | Reithmeier |
| 2004/0213008 A1 | 10/2004 | Bayersdorfer et al. |

FOREIGN PATENT DOCUMENTS

| | | |
|---|---|---|
| DE | 197 38 666 A1 | 2/1999 |
| DE | 197 40 575 A1 | 3/1999 |
| DE | 199 35 386 A1 | 2/2001 |
| DE | 102 60 831 B3 | 4/2004 |
| EP | 0 847 889 A2 | 6/1998 |

* cited by examiner

LIGHTING SYSTEM FOR DISPLAYS IN VEHICLES

This is a Continuation-In-Part application of application Ser. No. 10/742,840 filed Dec. 23, 2003.

FIELD OF THE INVENTION

The invention relates to a lighting system for displays, which may be used in particular in motor vehicles but also in other vehicles of any kind. Such lighting systems serve the purpose of illuminating symbols from behind in various colors and with different degrees of brightness, so as to on the one hand make the symbol visible in the dark and on the other to indicate to the driver of the vehicle when the function is activated. Examples of the use of such illuminated symbols are, for example, the switch for the rear window heating of a car, displays on the gearshift lever, ventilation settings and the like.

The purpose of lighting these displays is to make it possible for the driver to see the display in the dark so that he is able to activate the same if required. On the other hand, the lighting is intended to ensure that the driver is able to identify, both in daylight and in the dark, whether the function shown on the display as a symbol is activated or deactivated.

PRIOR ART

In order to ensure such functions, i.e. search lighting (having a brightness of typically several $cd/m^2$) on the one hand and function lighting (having a brightness typically in the range of between 100 and 3000 $cd/m^2$) on the other, it has been hitherto known to provide a uniform background or search lighting of the symbols by means of light-emitting diodes. A small window is provided directly next to the symbol. An optical fiber is disposed behind this window, which is connected to a bright light-emitting diode (LED) of another color and which causes the window area, which is mostly rectangular or round in shape and has a diameter or lateral length of approximately 2 mm, to light up brightly. Thus, both the search lighting and the function lighting, i.e. the lighting indicating an activated function, are realized by means of light-emitting diodes, i.e. punctiform lighting means. Such a system is known, for example, from DE 197 38 666 C1.

An arrangement for lighting the gear position indicator on the selector lever of a gearshift is known, for example, from DE 195 29 207 C2. The gearshift pattern, i.e. the symbols to be illuminated, is disposed on a transparent plate. Beneath the plate, a light-emitting diode is soldered on a circuit board below each of the gear position symbols. These light-emitting diodes serve the purpose of making the gear position symbols visible in a dimly lit manner when the vehicle lighting is switched on. If a corresponding gear position is engaged, the same light-emitting diodes are activated by means of electric signals so as to additionally brighten the gear position symbol of the respectively engaged gear.

An illuminated gear position indicator is also known from DE 296 06 501 U1 for the manual shifting of a variable-speed motor vehicle transmission. The display area of the manual gearshift is permanently illuminated in a diffuse manner, the light sources being light bulbs or glow lamps, light-emitting diodes or the light-emitting ends of one or more fiber optic cables, i.e. punctiform lighting media. The gear selected by the driver of the vehicle is finally additionally indicated in that the corresponding symbol on the cover is emphasized by an enhanced brightening in the display area which is permanently and uniformly illuminated in a diffuse manner.

The solution according to DE 296 06 501 U1 uses a mirror or prism for this purpose, which is carried along parallel to the movement of the gearshift lever. It reflects part of the light beams emitted by the light source at an angle such that the corresponding symbol is illuminated from below in an enhanced manner. Thus, this solution only uses a lighting means, i.e. a punctiform lighting means, whose illuminating power is enhanced as required in order to brighten up a certain area of the symbols by correspondingly directing the light.

DESCRIPTION OF THE INVENTION

It is an object of the invention to provide a structurally simple and economical lighting system for displays, in particular in motor vehicles, which ensures search lighting as well as function lighting.

The invention is based on the idea of providing the search lighting by means of punctiform lighting medium and also the function lighting by means of a punctiform lighting medium. The lighting means emit the light essentially in a punctiform manner, i.e. starting from one spot. The combination of the two lighting media makes it possible to achieve on the one hand a uniform illumination of all the symbols such that the driver and/or passenger can easily see the symbol even in the dark. On the other hand, by means of the punctiform lighting medium of the function lighting, which can specifically also illuminate, for example, just areas of the symbols from behind, for instance in the case of a gear position indicator, so that only the gear presently engaged or the gear position presently selected is illuminated from behind, a targeted brightening-up is achieved when the function forming the basis for the display is activated. This lighting means for the function lighting is brighter than the lighting means for the search lighting such that the activated function lighting which indicates the activated function is also visible in sunlight.

The lighting system according to the invention does not require any further components in addition to the support on which the first and second lighting means are disposed and the transparent cover which may be either completely transparent or opaque, i.e. milky, and thus a simple and economical structure can be achieved without a lighting function being affected thereby.

Advantageous embodiments are characterized by the remaining claims.

According to a preferred embodiment, the first and second lighting means, i.e. the lighting means for punctiform illumination for the function and search lighting, are designed as light-emitting diodes (LED). It is thereby preferred for so-called smart LEDs to be used, which have a very small design.

Various colors and degrees of brightness are known for light-emitting diodes, and thus the light-emitting diode can be selected on the one hand appropriate to design considerations, or, depending on the symbols to be shown, with respect to color or according to the brightness to be achieved in order to design the light of the light-emitting diode such that it is visible even in daylight.

The support on which the lighting means are arranged is preferably designed as a circuit board or a flexible printed circuit board in which the connections for the light-emitting diodes are provided. A plurality of connections for light-emitting diodes or for first and second lighting means may thereby be provided as required if, for example as a special application, the gear indicating symbols are supposed to be illuminated from behind on the gearshift lever and if, when the gear is engaged, only that gear which is presently activated is supposed to be illuminated from behind. This means that one light-emitting diode is provided for each gear position, which lights up when the gear is correspondingly activated. Thus, the number and position of the first lighting means may be adapted as required.

The side of the cover facing the support is advantageously equipped with a diffusing disk or the cover itself is milky. This makes it possible for the light emitted by the light-emitting diodes or the first and second lighting means to be uniformly scattered, which ensures that the symbols are uniformly illuminated by the light-emitting diodes or the first and second lighting means. In particular, the light of the light-emitting diodes or the first and second lighting means does not appear as a cone of light on the visible side of the cover, i.e. the side facing towards the driver, but rather as scattered light illuminating uniformly.

According to a particularly preferred embodiment, a lighting-limiting device is further provided between the support on which the first and second lighting means are arranged and the cover, said device limiting the light emitted by the first lighting means to an area of the cover which is to be illuminated from behind. This is particularly advantageous if a plurality of first lighting means are provided in order to illuminate from behind only a certain part of the display, namely precisely that part whose function is presently activated, as was the case, for instance, for the gear position indicator on the gearshift lever where a plurality of different functions (e.g. gears) are represented. By providing such a lighting-limiting device, it is possible to prevent neighboring areas from being discolored or brightened by scattered light from the presently active first lighting means. In other words, the lighting-limiting device can also be abstractly referred to as light partition.

According to an embodiment, the lighting-limiting device is designed as a transparent distance plate. This distance plate has holes which correspond to the area of the cover to be illuminated from behind by the first and second lighting means. The scattered light of the first and second lighting means, i.e. for example, of the light-emitting diode, impinges on the inner surfaces of the holes of the distance plate, whereat it is reflected owing to a suitable design of these inner surfaces such that it does not enter into neighboring areas. The holes of the distance plate, which are designed like windows, may have any shape depending on requirements, for example they may be square or round or may even be adapted as regards shape and size to the symbols to be illuminated from behind. If the distance plate has, for instance, a thickness of approximately 3 to 5 mm, preferably 3 to 4 mm, and if the holes having a window size of approximately 4 mm×4.5 mm accommodate two light-emitting diodes having a size, for example, of approximately 1.3 mm×0.8 mm, the symbols are uniformly illuminated, thereby simultaneously avoiding excessive expansion of the light of the light-emitting diodes and thus an undesirable brightening of neighboring areas, in particular by light emitted by the light-emitting diode for the function lighting, owing to the reflecting inner surfaces of the holes of the distance plate. If a diffusing disk is used in order to make the light appear more uniform, this may—as already mentioned—also be mounted on the distance plate instead of on the cover if a distance plate is provided.

The inner surfaces of the holes of the distance plate, i.e. those surfaces which extend essentially vertically to the cover area or the support area, are advantageously varnished or polished. This causes the light of the light-emitting diodes or the first and second lighting means to be well reflected such that in particular when the function lighting is activated, no light will enter into neighboring areas and cause an undesired brightness there.

Instead of polishing or varnishing the inner walls of the windows of the distance plate, it is potentially also possible to provide additional windows in the distance plate so as to cause further refraction of the light such that no light is reflected towards the surface of the distance plate (i.e. the side facing the cover), which could lead to an undesirable brightening or an undesirable discoloring in areas which are not intended to be illuminated.

As an alternative to the lighting-limiting device by means of the transparent distance plate, it is preferred to provide an optical fiber as a lighting-limiting device. The desired screening is also achieved by this optical fiber which is disposed between the support and the cover in the area to be illuminated from behind by the first lighting means.

Finally, it is preferred to provide an injection-molded part (a so-called light partition) as the lighting-limiting device, which is disposed between the support and the cover and which is opaque. This injection-molded part, which limits the area to be illuminated from behind, may, for example, be disposed around the light-emitting diodes in a tubular manner such that scattered light is prevented from escaping from the tubular area in which the light-emitting diodes are located.

Finally, a combination of a light partition and a distance plate is also conceivable as the lighting-limiting device, with the light partition being inserted into the holes of the distance plate or being formed directly in a 2K injection molding process. This is particularly advantageous if it is difficult, for example as a result of geometrical problems, to treat the inner walls of the windows, e.g. by varnishing.

A particularly preferred embodiment is to attach the first and second lighting means for instance at a distance of between 2 and 5 mm, preferably 3 to 4 mm, from the cover. A sufficient expansion of the light emitted by the first and second lighting means, in particular the light-emitting diodes, is thereby possible, and thus a uniform illumination from behind of the symbols on the cover can be achieved.

BRIEF DESCRIPTION OF THE DRAWINGS

In the following, the invention is described purely by way of example using the accompanying figures, in which.

MANNERS OF REALIZING THE INVENTION

Figure 1:
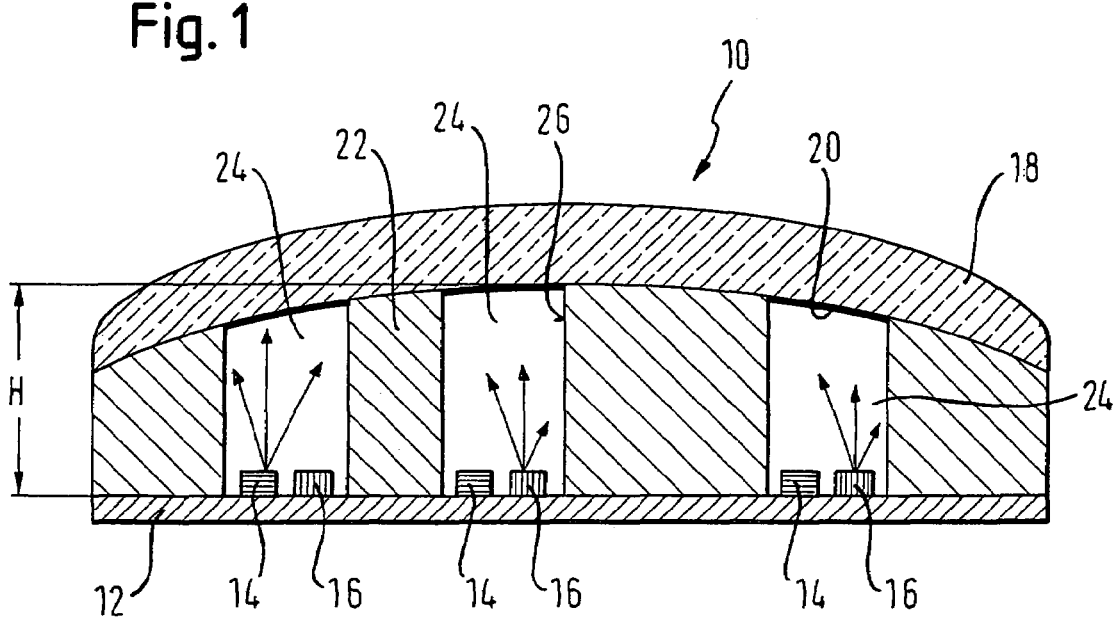
FIG. 1 shows a section through a lighting means according to the invention.

FIG. 1 shows a section through a lighting system according to the invention which may be used, for example, for illuminating gearshift levers in motor vehicles. The lighting system 10 comprises a support 12 which is designed as a circuit board, on which connections are provided for LEDs 14 as first lighting means and for LEDs 16 as the second lighting means. The LEDs of the first lighting means or the function lighting (hereinafter F-LEDs) are arranged adjacent to the LEDs of the second lighting means or the search lighting (hereinafter S-LEDs).

The cover 18 for its part represents the limitation of the lighting system that is visible to the passengers of the vehicle, i.e. the visible side of the lighting system. The cover 18 is, for example, clear, i.e. completely transparent, with symbols 20 being applied to the rear side of the cover 18, as is shown, for instance, in FIG. 3, by means of engraving, screen printing or a hot stamping foil. The cover 18 is produced, for example, from a transparent PMMA material. The cover 18 may alternatively also be produced from a milky screening material.

Figure 4:
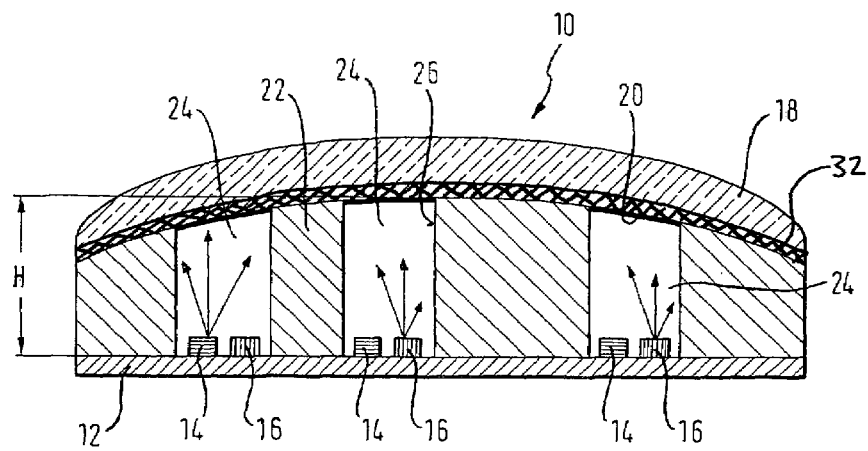
FIGS. 4, 5, and 6 show cut through lighting apparatuses according to exemplary aspects of the present invention.

As shown in FIG. 4, a diffusing disk 32 is attached to the under side of the cover 18, which scatters the light emitted by the light-emitting diodes 14 and 16 such that the entire area of the cover 18 to be illuminated from behind in each case by a light-emitting diode 14 and/or 16 is uniformly illuminated.

Figure 5:
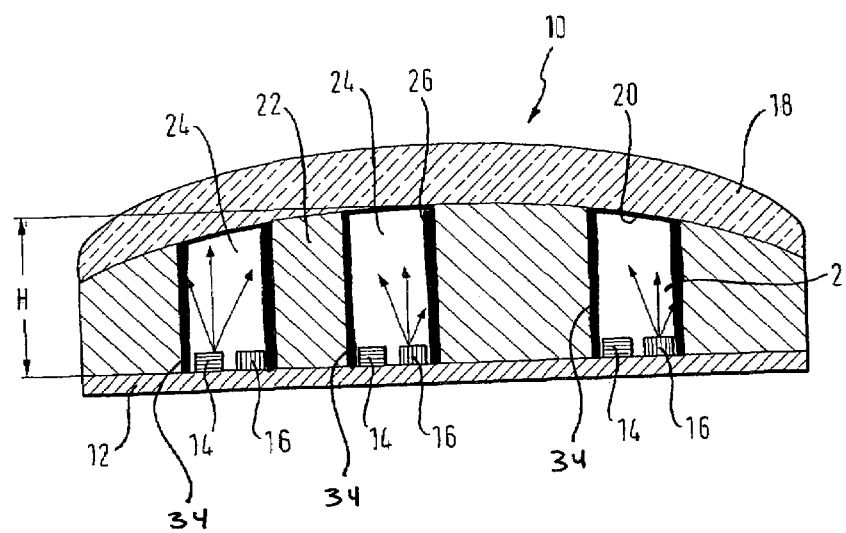

In the embodiment shown in FIG. 1, a distance plate 22 is provided between the cover 18 and the support 12 with the lighting means 14 and 16 attached thereto. This distance plate 22, which is shown as a top view in FIG. 2, has cutouts 24 which correspond to the areas where the symbols 20 are provided on the cover 18, which are to be illuminated from behind as function lighting by the light-emitting diodes 14 and as search lighting by the light-emitting diodes 16. The lateral faces 26 of the cutouts 24 of the distance plate 22 are polished, varnished or provided with non-transparent inserts, so-called light partitions, such that the light originating from the light-emitting diodes 14 and 16 and impinging on these lateral faces 26 is reflected there and therefore does not enter areas that are not supposed to be illuminated, reaching the surface of the cover plate 18. Rather, the light emitted by the light-emitting diodes 14 and 16 remains in those areas which are cut out in the distance plate 22, by means of which scattered light beside the symbols to be illuminated is avoided. Alternatively, the lateral faces are themselves made from a non-transparent material, for example plastic. As shown in FIG. 5, an injection-molded part may be disposed between the support 12 and the cover 18. The injection-molded part limits the area to be illuminated from behind, and may be disposed around the light-emitting diodes in a tubular manner such that scattered light is prevented from escaping from the tubular area in which the light-emitting diodes are located.

The distance plate 22 is ideally sprayed onto the cover 18 such that a gap does not occur between the cover and the distance plate 22 or light partition, through which scattered light could penetrate and such that the cutouts 24 of the distance plate 22 or light partition are exactly fixed relative to the symbols 20.

The material for the light partition should be selected such that even at a wall thickness of less than 1 mm, no noteworthy light transmission between two cutouts into neighboring areas is possible.

Figure 6:
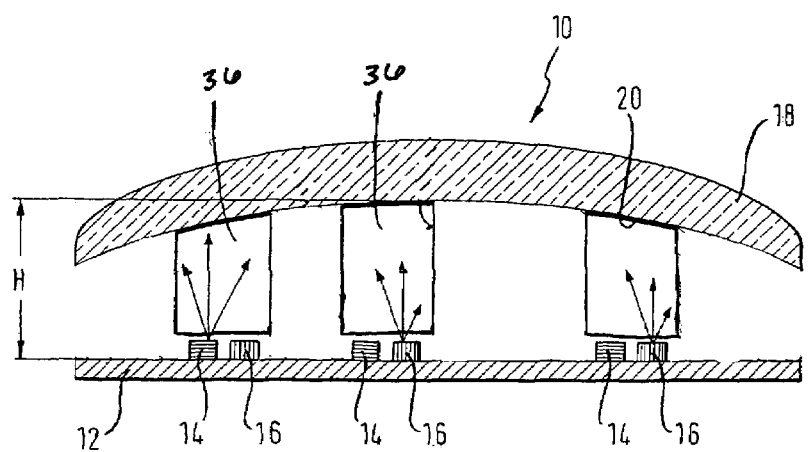

As shown in FIG. 6, according to an exemplary aspect of the present invention, the light emitted from the light-emitting diodes 14 and 16 may be limited to an area of the cover 18 to be illuminated from behind by an optical fiber, such as optical fiber 36, which is mounted between the support 12 and the cover 18.

Figure 2:
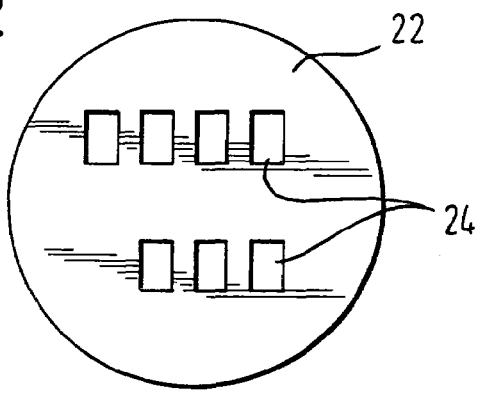
FIG. 2 shows a top view of a distance plate which may be used, for example, for illuminating a gearshift lever.

The windows 24 shown in FIG. 2 correspond to the locations of the symbols 20 on the cover 18. All of the windows 24 are designed in a rectangular manner in the embodiment shown therein. They may, however, be adapted as required to the size and/or shape of the symbols 20 to be illuminated from behind with the function lighting and search lighting by the light-emitting diodes 14 and/or 16. A typical window size is in the range of approximately 4.5 mm×4 mm, with the light-emitting diodes 14 and 16 arranged therein having a size of approximately 1.3 mm×0.8 mm (height 0.65 mm).

Furthermore, the light-emitting diodes 14 and 16 are preferably arranged at a distance H of between approximately 2 and 5 mm, preferably 3 to 4 mm, below the cover 18. This ensures that the light emitted by the light-emitting diodes 14 and 16 can expand uniformly and thus uniformly illuminates the area of the symbol 20 to be illuminated from behind by the light-emitting diode 14 during function lighting and by the light-emitting diode 16 during search lighting.

Figure 3:
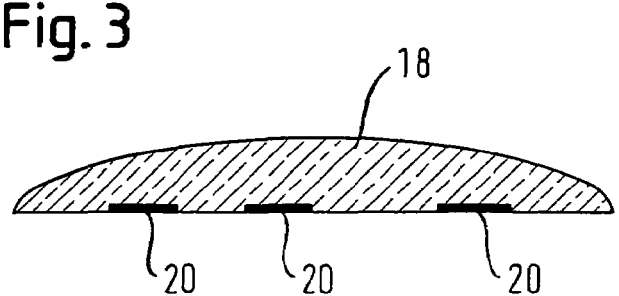
FIG. 3 shows a section through a cover which may be used for the lighting system of a gearshift lever.

It is therefore possible to ensure a uniform so-called search lighting of the display by means of the lighting means for displays shown in FIGS. 1 to 3. This is achieved by means of the light emitted by the S-LED 16. This means that the display is uniformly illuminated from behind in the dark, regardless of the function activation, so that the driver or passenger can see the location of the display and can at the same time also see which function is initiated by activating the corresponding switch.

It is simultaneously ensured that the driver or passenger will always immediately see when the function of the display or a function represented by the display, for example in the area of the gearshift of vehicles, is activated. If the symbols applied to the gearshift lever are illuminated from behind by a corresponding lighting system 10, and if, for example, a certain gear is activated, one of the light-emitting diodes 14 shown in FIG. 1 lights up and thus informs the driver which gear is presently activated. Since no light from the light-emitting diode 14 enters into the neighboring areas of the display, the driver can always see precisely which function is activated. The brightness or color of the light-emitting diode 14 is thereby selected such that the function lighting is also visible in daylight, so that a driver will also know during daylight which gear is engaged or which function is activated. It furthermore advantageously differs from the S-LEDs not just as regards its illuminating power, but rather also as regards its color.

The essential aspect of the present invention is therefore the provision of a combined search and function lighting for displays in motor vehicles, which can be realized in a simple manner and which allows an exact illumination from behind of the corresponding areas of the cover during function lighting.

The invention claimed is:

1. A lighting system for displays, the lighting system comprising:
   a support;
   at least one function lighting means for punctiform illumination, which is disposed on said support;
   at least one search lighting means for punctiform illumination, which is disposed on said support; and
   a transparent cover which is arranged at a distance from said support on a side of said support with said function and search lighting means, and which has at least one symbol, representing a function;
   wherein the at least one symbol is illuminated from behind by said search lighting means to provide a uniform search lighting and by said function lighting means to indicate that the function represented by the symbol is activated; and
   wherein said function lighting means is activated only when the function represented by the symbol is activated, and thus operates independently of said search lighting means; and
   wherein the lighting system further comprises a lighting-limiting device which comprises a transparent distance plate, disposed between said support with said function and search lighting means and said cover, wherein the transparent distance plate is provided with holes corresponding to the area of said cover illuminated from behind by said function lighting means, and wherein the transparent distance plate limits the light emitted by said function and search lighting means to the area of said cover illuminated from behind; and wherein the holes in the transparent distance plate extend entirely through the transparent distance plate from a side of said support to a side of said cover.

2. The lighting system according to claim 1, wherein each of the function and search lighting means is a light-emitting diode.

3. The lighting system according to claim 1, wherein said support is a circuit board or a flexible printed circuit board.

4. The lighting system according to claim 1, wherein a diffusing disk is attached on a side of said cover facing said support or wherein said cover is milky.

5. The lighting system according to claim 1, wherein the inner surfaces of the holes of the distance plate are varnished or polished.

6. The lighting system according to claim 1, wherein the lighting-limiting device further comprises an injection-molded part which is inserted in the holes of the distance plate.

7. The lighting system according to claim 1, wherein said function lighting means is arranged at a distance of between 2 and 5 mm from said cover.

8. The lighting system according to claim 1, wherein said function lighting means illuminates with a first color and said search lighting means illuminates with a second color, different from the first color.

9. The lighting system according to claim 1, wherein said function lighting means is brighter than said search lighting means.

10. The lighting system according to claim 1, wherein said function lighting means is arranged at a distance of between 3 and 4 mm from the cover.

11. A lighting system for displays, comprising:
   a support;
   at least one function lighting means for punctiform illumination, which is disposed on said support;
   at least one search lighting means for punctiform illumination, which is disposed on said support; and
   a transparent cover which is arranged at a distance from said support on a side of said support with said function and search lighting means, and which has at least one symbol, representing a function;
   wherein the at least one symbol is illuminated from behind by said search lighting means to provide a uniform search lighting and by said function lighting means to indicate that the function represented by the symbol is activated; and
   wherein said function lighting means is activated only when the function represented by the symbol is activated, and thus operates independently of said search lighting means;
   wherein the lighting system further comprises a lighting-limiting device between said support with said function and search lighting means and said cover, which limits the light emitted by said function and search lighting means to an area of said cover illuminated from behind; and
   wherein the lighting-limiting device comprises at least one injection-molded part which is disposed between said support and said cover, wherein the injection-molded part is provided with holes extending entirely through the injection-molded part, the holes corresponding to the area of said cover illuminated from behind by said function lighting means, wherein the injection-molded part limits the area illuminated from behind by said function and search lighting means.

12. The lighting system according to claim 11, wherein each of said function and search lighting means is a light-emitting diode.

13. The lighting system according to claim 11, wherein the support is a circuit board or a flexible printed circuit board.

14. The lighting system according to claim 11, wherein a diffusing disk is attached on a side of the cover facing said support or wherein said cover is milky.

15. The lighting system according to claim 11, wherein said function lighting means is arranged at a distance of between 2 and 5 mm from said cover.

16. The lighting system according to claim 11, wherein said function lighting means illuminates with a first color and said search lighting means illuminates with a second color, different from the first color.

17. The lighting system according to claim 11, wherein said function lighting means is brighter than said search lighting means.

18. The lighting system according to claim 11, wherein said function lighting means is arranged at a distance of between 3 and 4 mm from the cover.

* * * * *